US008793617B2

(12) United States Patent
Xu et al.

(10) Patent No.: US 8,793,617 B2
(45) Date of Patent: Jul. 29, 2014

(54) INTEGRATING TRANSPORT MODES INTO A COMMUNICATION STREAM

(75) Inventors: Jon Changzheng Xu, Seattle, WA (US); Christer Garbis, Kirkland, WA (US); Stephanie Teng, Seattle, WA (US); Yili Wang, Camarillo, CA (US); Karl Petter Karlsson, Karlskrona (SE)

(73) Assignee: Microsoft Corporation, Redmond, WA (US)

( * ) Notice: Subject to any disclaimer, the term of this patent is extended or adjusted under 35 U.S.C. 154(b) by 863 days.

(21) Appl. No.: 12/512,700

(22) Filed: Jul. 30, 2009

(65) Prior Publication Data

US 2011/0029923 A1 Feb. 3, 2011

(51) Int. Cl.
*G06F 3/048* (2013.01)
*H04L 12/58* (2006.01)

(52) U.S. Cl.
CPC .............. *H04L 51/36* (2013.01); *H04L 12/589* (2013.01)
USPC .......................................................... 715/825

(58) Field of Classification Search
CPC .............................. H04L 51/36; H04L 12/589
USPC .................................................. 715/825, 845
See application file for complete search history.

(56) References Cited

U.S. PATENT DOCUMENTS 7,333,507 B2 2/2008 Bravin et al.
7,974,849 B1 * 7/2011 Begole et al. .................. 705/1.1
2004/0054646 A1 * 3/2004 Daniell et al. .................... 707/1
2006/0026237 A1 2/2006 Wang et al.
2006/0053379 A1 * 3/2006 Henderson et al. ........... 715/751
2006/0072542 A1 4/2006 Sinnreich et al.
2006/0173961 A1 8/2006 Turski et al.
2007/0116194 A1 5/2007 Agapi et al.
2007/0121808 A1 5/2007 Brunson et al.
2008/0059587 A1 * 3/2008 Burtner et al. ................ 709/206

(Continued)

OTHER PUBLICATIONS

"To Reinvent Mobile Communications with Yahoo! oneConnect(TM)", retrieved at http://yhoo.client.shareholder.com/press/ReleaseDetail.cfm?ReleaseID=293420, Feb. 12, 2008, pp. 3.

(Continued)

*Primary Examiner* — Omar Abdul-Ali
*Assistant Examiner* — Anil Bhargava
(74) *Attorney, Agent, or Firm* — Bryan Webster; Andrew Sanders; Micky Minhas

(57) ABSTRACT

Integrating multiple transport modes into a single communication stream on a computing device such as a mobile computing device. One or more recipients and one or more transport modes available for communication with the one or more recipients are provided to a user. An application program executing on the computing device receives a first message from the user to send to one or more selected recipients. The computing device transmits the received first message to the selected recipients via a first transport mode. Thereafter, the computing device receives a second message from one of the recipients via a second transport mode. The received second message is displayed to the user in the same communication stream by the application program. As an example, the user uses the application program to communicate with the recipients using text messaging, electronic mail message, and other transport modes.

20 Claims, 6 Drawing Sheets

602
Conversations 12:32
Marco Smith
Marco (IM) says:
Have you ever gone to Blue C Sushi? The place is not very good.
604
Diana (IM) says:
No. I have never been. I'll take your word for it, though.
Marco is Offline. Messages you send will be delivered when they sign in.
Other ways to reach Marco:
606
Text Call Email
Type a message
Send Close

(56) References Cited

U.S. PATENT DOCUMENTS

| | | | | |
|---|---|---|---|---|
| 2008/0148154 | A1* | 6/2008 | Burrell et al. | 715/733 |
| 2008/0256107 | A1* | 10/2008 | Banga et al. | 707/102 |
| 2009/0119606 | A1* | 5/2009 | Gilbert | 715/758 |
| 2009/0170480 | A1 | 7/2009 | Lee | |
| 2009/0244000 | A1* | 10/2009 | Thompson et al. | 345/156 |
| 2010/0162131 | A1* | 6/2010 | Gaillard et al. | 715/751 |
| 2010/0167766 | A1* | 7/2010 | Duarte et al. | 455/466 |
| 2010/0262660 | A1* | 10/2010 | Little et al. | 709/206 |
| 2011/0126126 | A1* | 5/2011 | Blair | 715/752 |
| 2012/0124508 | A1* | 5/2012 | Morin et al. | 715/781 |

OTHER PUBLICATIONS

"About the Mobile AIM® Service", retrieved at <<http://help.aol.com/help/mysupport/printdocument.jsp?title=%20%20%20%20About%20th>>, Jun. 8, 2009, pp. 3.

Collins-Sussman, "People-Centric Communication", Retrieved at <<http://www.red-bean.com/sussman/brain/people-centric.html>>, Dec. 18, 2004, pp. 4.

"Receive Breaking News via IM, SMS or Email", Retrieved at <<http://www.masternewmedia.org/news/2006/03/03/receive_breaking_news_via_im.htm>>, Mar. 3, 2006, pp. 9.

* cited by examiner

302
NEW COMMUNICATION THREAD?
YES
NO
301
START A NEW THREAD
304
SELECT AN EXISTING COMMUNICATION THREAD
306
COMMUNICATION THREAD WITH SELECTED RECIPIENT OVER SELECTED MODE
308
PRESENCE STATUS OF RECIPIENT CHANGES?
YES
NO
307
BEGIN OR CONTINUE CONVERSATION
310
SWITCH COMMUNICATION MODE (E.G., AUTOMATICALLY OR MANUALLY BY USER)

INTEGRATING TRANSPORT MODES INTO A COMMUNICATION STREAM

BACKGROUND

Electronic communications among users of computing devices are common. Examples of technologies enabling such communications include electronic mail (email), instant messaging (IM), short messaging service (SMS), and multimedia messaging service (MMS), among others. Each of these technologies has certain advantages and disadvantages. Email, for example, enables communications between multiple users, and the communications are often not conducted in real-time. However, email generally requires access to the Internet. IM is similar to email, but differs primarily in that conversations happen in real-time. SMS is used primarily to send brief messages with mobile computing devices, but the cost of transmission can be costly.

With existing systems, services from a given communications provider are incompatible with services from other providers. As such, to transmit and receive communications on different communication technologies, the user opens separate applications to connect with services that support the different communication technologies. For example, if the user wants to communicate with one or more other users via, for example, IM, SMS, and email at the same time, the user is forced to execute three separate applications and monitor three communication streams. Such existing systems are inefficient and complicate the user experience.

SUMMARY

Embodiments of the disclosure provide a user with an identification of one or more recipients and transport modes available for communication with the one or more recipients. A selection of one or more of the recipients is thereafter received by an application program executing on a computing device. The application program further receives a first message from a user to send to the selected recipients in a communication stream. The computing device transmits over a first one of the transport modes, the received first message to the selected recipients and receives, over a second one of the transport modes, a second message from at least one of the selected recipients. The application program thereafter displays the received second message to the user in the same communication stream.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
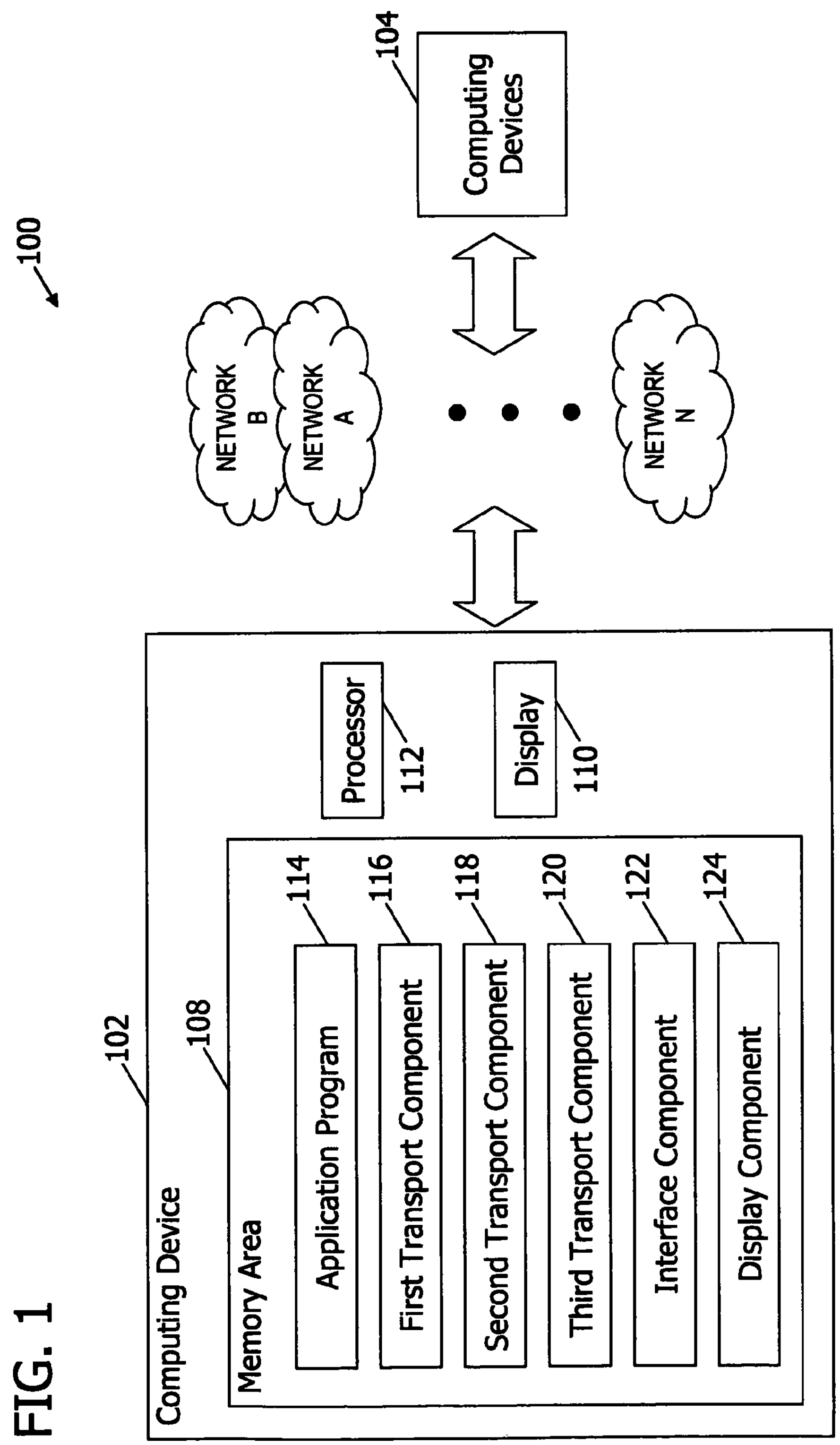
FIG. 1 is an exemplary block diagram of a computing device having a memory area storing components for integrating multiple transfer modes into a single communication stream.

Referring to the figures, embodiments of the present disclosure provide a networking system 100 for starting, replying, and continuing one or more conversations in a single communication stream by a user on a computing device 102. Embodiments of the disclosure provide a user with a seamless integration of different transport modes without switching applications to initiate communication with one or more computing devices 104 via one or more networks 106 such as the Internet. In particular, the computing device 102 can communicate with the one or more of the computing devices 104 via, for example, Short Message Service (SMS) text, Instant Messaging (IM), and email in an application program displaying a single communication thread to the user. In some embodiments, each of the networks 106 supports one or more transport modes.

Further, embodiments of the present disclosure enable, for example, a user communicating via SMS and a user communicating via IM to seamlessly exchange messages bi-directionally for both initiating and replying to such messages. Thus, SMS users can initiate messages to and reply to messages from destinations that can be, for example, either SMS, IM, or email (or other like messaging service). Therefore, embodiments of the present disclosure enables a user that engages in text-based communication with a recipient to not have to select an application that is associated with a particular type of transport mode, such as SMS, IM, or email. For example, when a user selects a recipient to initiate a new conversation in a communication stream, a list of contacts from which the user can select a one or more recipients is displayed to the user on the computing device 102 via a user interface. A list of available transport modes are also presented to the user. In the alternative, a default transport mode is automatically selected by an application program 114 (e.g., a previously selected transport mode, a reliable transport mode, a preferred transport mode, etc.). However, if at any time during the conversation the user decides to switch transport modes, or if a transport mode in that is currently being used becomes unavailable, the system 100 enables the user to switch transport modes without a need to switch applications by seamlessly integrating the new transport mode into the communication thread. Thus, the system 100 enables the user to compose and send communications such as text-based communications to one or more selected recipients with various transport modes without the need to switch between mode-specific applications.

Further, embodiments of the present disclosure include a mechanism that enables the system 100 to automatically determine whether the online/offline status of a selected recipient has changed, and subsequently determine and suggest an alternate transport mode for a message to be sent to that particular recipient. The switching of a transport mode is executed inline and provides an ability to a user to continue the text conversation without a need to switch context and/or applications, while maintaining a continuity of the text thread. These and other aspects and embodiments of the present disclosure are next described in greater detail.

Referring again to FIG. 1, an exemplary block diagram of the system 100 includes the computing device 102, the one or more networks 106, and the one or more computing devices 104. The computing device 102 is configured to communicate with the one or more computing devices 104 via the one or more networks 106, such as, network “A” using a first transport mode (e.g., SMS). In some embodiments, the one or more computing devices 104 are configured to communicate with the computing device 102 via the one or more networks 106, such as, network "B" using a second transport mode (e.g., IM). Thus, in this example, the computing device 102 communicates via SMS and the one or more computing devices 104 communicate via IM. However, the computing device 102 and the one or more computing devices 104 can communicate via any appropriate type of mobile messaging service. Further, the one or more networks 106, for example, networks "A" and "B" can each include any suitable type of mobile communication network. For example, each of the networks "A" and "B" can be operated or otherwise managed by any appropriate type of Mobile Network Operator (MNO), mobile virtual network operator, wireless service provider, wireless carrier, mobile phone operator, or cellular company or organization. Any suitable quantity (e.g., network A, network B, network C, . . . , network N, where N is a positive integer) and type (e.g., wired, wireless, or combination thereof) of networks can be used with system 100 in accordance with exemplary embodiments.

While some embodiments of the disclosure are illustrated and described herein with reference to the computing device 102 being a mobile computing device such as a mobile telephone, aspects of the disclosure are operable with any device that performs the functionality illustrated and described herein, or its equivalent. For example, embodiments of the disclosure are operable with netbooks, desktop computing devices, laptop computers, and other computing devices. In such embodiments, the application program is stored by a cloud service and accessible by any device of the user.

Referring again to FIG. 1, an exemplary block diagram illustrates the computing device 102 having a memory area 108 for storing components for integrating multiple communication applications, for example, multiple conversations using multiple transport modes, into a single communication stream. The computing device 102 further includes a display 110 and at least one processor 112. The display 110 may be, for example, a capacitive touch screen display that is integrated into the computing device 102 or external to the computing device 102. User input functionality is provided in the display 110 which acts as a user input selection device. The display 110 is configured to be responsive to a user pressing contact on the display 110 to selectively perform functionality. Thus, a user can operate the desired telephone functions available with the computing device 102 by contacting a surface of the display 110 as well as other functions provided herein.

Memory area 108 stores one or more computer-executable components. Exemplary components include, but are not limited to, one or more application programs 114, a first transport component 116, a second transport component 118, a third transport component 120, an interface component 122, and a display component 124. While the components are shown to be stored in memory area 108, the components may be stored and executed from a memory area remote from computing device 102. For example, the one or more application programs 114 may be stored in a cloud service, a database, or other memory area accessible by computing device 102. Such embodiments reduce the computational and storage burden on computing device 102.

Processor 112 executes computer-executable instructions for implementing aspects of the disclosure. In some embodiments, the processor 112 is transformed into a special purpose microprocessor by executing computer-executable instructions or by otherwise being programmed. For example, the first transport component 116, when executed by the processor 112, causes the processor 112 to send a first message to a recipient using the application program 114 and a first transport mode. The first transport mode is determined or selected by, for example, by the computing device 102. The second transport component 118, when executed by the processor 112, causes the processor 112 to send a second message to the recipient using the application program and a second transport mode. The interface component 122, when executed by the processor 112 causes the processor 112 to receive a third message from the recipient using the first or second transport mode, and the display component 124 when executed by the processor 112 causes the processor 112 to display, by the application program 114, the received third message in a user interface. In addition, the processor 112 may also be programmed with instructions such as described herein with reference to FIG. 2 and FIG. 3.

Figure 2:
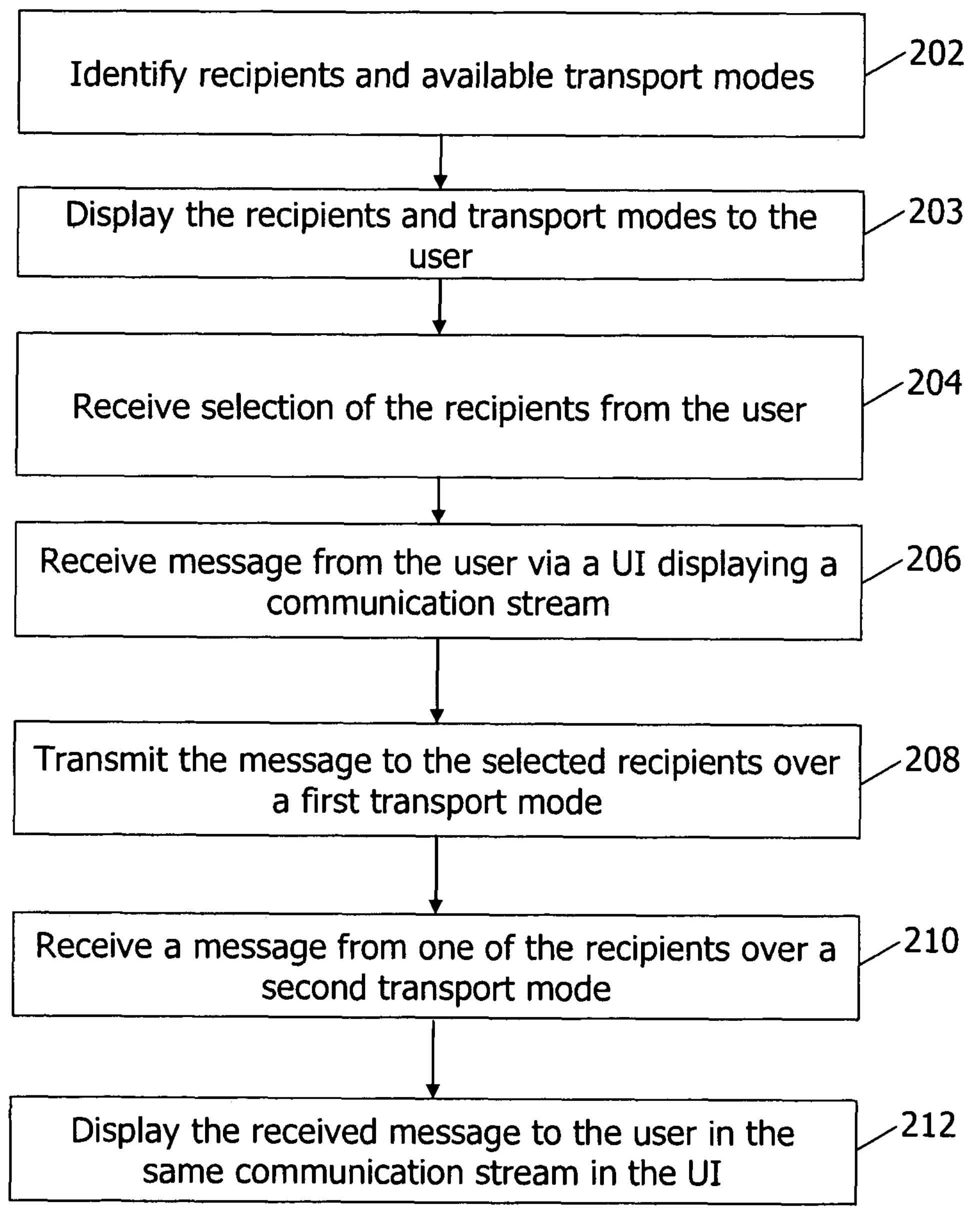
FIGS. 2 and 3 are exemplary flow charts illustrating a process for integrating multiple transfer modes into a single communication stream.

Referring next to FIG. 2, an exemplary flow chart illustrates a process for integrating multiple conversations including multiple transport modes into a single communication stream on the computing device 102. At 202, one or more recipients and transport modes for communication therewith are identified. In one embodiment, the identification of the recipients and the transport modes for communication with each of the recipients may be initiated upon a request by a user to access an address book on the computing device 102. In an alternative embodiment, a user may enter a contact name, or a name corresponding to a group of contacts that prompts the identification of the contact or group of contacts as selected recipients. At 203, the one or more recipients that have been identified are displayed to the user. In one embodiment, a transport mode for each of the identified recipients is also displayed. At 204, a selection of the one or more recipients is received by the application program 114 executing on the computing device 102. In one embodiment, once the application program 114 receives the selected one or more recipients, the application program 114 identifies and thereafter displays available transport modes corresponding to the selected one or more recipients based on, for example, a presence indication of the one or more recipients. For example, the application program 114 provides the user with transport modes according to an availability of the transport modes with respect to the one or more recipients, for example, a particular recipient may not have SMS capabilities, or may not have Internet access for email or IM. In some embodiments, the presence indication represents the online availability of the recipients in a network. In other embodiments, the presence indication represents any attribute of the recipients such as a location of the recipient or computing device 102, a relationship to a calendar of the recipients, etc.

Thus, the application program 114 provides the user with a list of transport modes that are available for each recipient. In one embodiment, the application program 114 provides the user with a transport mode that is determined to have the highest availability. For example, the user may rank transport modes from most desired to least desired according to individual contacts or all contacts. Thus, the selected transport mode may be the transport mode that is the highest ranked transport mode available from a list provided by the user. In an alternative embodiment, the user may request a particular transport mode from which the application program 114 may default to if the requested transport mode is available to a selected recipient.

At 206, a first message from a user to send to the selected one or more recipients is received by the application program 114. The first message may include one or more of the following: audio data, image data, video data, and textual data. At 208, the received first message for delivery to the selected one or more recipients is transmitted by the computing device 102 over a first transport mode. In one embodiment, the first transport mode may be a default transport mode, or a selected transport mode of available transport modes. However, the selected one or more recipients need not respond via the same transport mode as the transport mode of the first message. For example, the selected one or more recipients' presence status may have changed since the first message was sent, and therefore, the first transport mode may no longer be available for the selected one or more recipients to send a second message from. In some embodiments, aspects of the disclosure detect the change in the presence status of one or more of the recipients, generate suggestions for other transport modes for communicating with that recipient, and prompt the user to select one of the suggested transport modes. In other embodiments, aspects of the disclosure automatically select and employ one of the suggested transport modes. In still other embodiments, aspects of the disclosure prompt the user to manually identify and select an alternate transport mode on request from the user or based on a change in presence status.

At 210, a second message from the selected one or more recipients is received by the computing device 102 over a second one of the transport modes. At 212, the received second message is displayed to the user by the application program 114 on the display 110. In one embodiment, the application program 114 aggregates the first message and the second message into a single message thread in a user interface. In a further embodiment, the application program 114 aggregates each message sent to the selected one or more recipients and each message received from the selected one or more recipients into a single message thread regardless of the transport mode of each of the sent and received messages. Thus, when any of the selected one or more recipients reply to an original message from the user via the one or more computing devices 104, each of the replies are displayed to the user in a single communication stream, for example, within an original aggregated point of launch, making the text thread contextualized.

Figure 3:
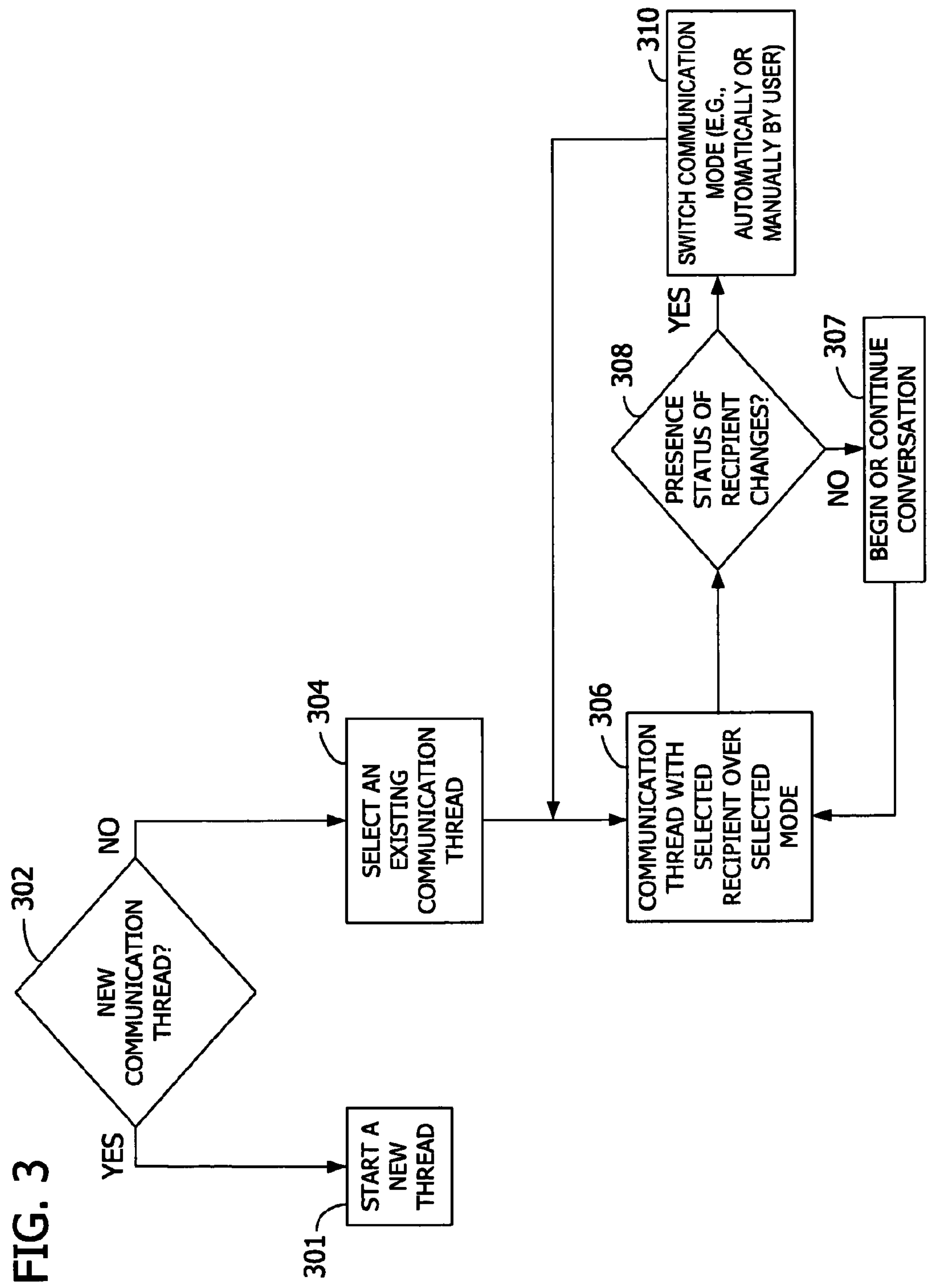

Referring next to FIG. 3, an exemplary flow diagram illustrates an alternative embodiment of the disclosure. At 302, it is determined whether a new communication thread is requested by a user. For example, instead of initiating a new communication thread as described above with respect to FIG. 2, a user may access an existing communication thread. In one embodiment, a user may be prompted with a question on a user interface (e.g., "Continue existing thread?") after the user indicates a desire to communicate with a contact, from which the user selects "yes" or "no." At 301, if a user indicates a desire to select a new communication thread, for example, by selecting "no", then the user may select a contact as described at operation 202 above. However, if the user indicates a desire to continue an existing thread, for example, by selecting "yes", at 304 the user may select an existing communication thread to continue. At 306, the application program 114 may provide the user with a list of existing communication threads and available transport modes based on recipients associated with the existing communication threads. For example, a history of communication threads may be stored and accessed from the memory area 108 of the computing device 102. The computing device 102 may also access one or more networks 106, such as the Internet to establish a connection with one or more of the computing devices 104 to determine a presence indication of each of the computing devices 104. Thus, a user is presented with existing communication threads as well as a presence indication of each mobile computing device associated with each existing communication thread.

At 308, a presence status is determined of the selected recipient corresponding to a selected existing communication thread. In one embodiment, the transport mode that is initially checked is a transport mode that was last used in the selected communication thread. In a further embodiment, the transport mode may be the transport mode indicated by the application program 114 as having the highest present availability among the other transport modes, or the first transport mode may be a default transport mode. For example, the first mobile computing device 102 may access an IM server via the Internet to provide a presence status update on a particular recipient involved in a selected communication thread. If a transport mode that was previously used in the selected communication thread is available based on the presence status of the selected recipient, the application program 114 may default to that transport mode, and at 307, the existing conversation begins utilizing the previous transport mode. If, however, the presence status of the selected recipient indicates that the previous transport mode is not available, at 310, the user selects an alternate transport mode. After an alternate transport mode is selected, the process continues back to operation 308 where a determination is again made as to whether the presence status of the selected recipient has changed/is available with respect to the selected alternate transport mode. In one embodiment, if the presence status has changed, the process continues to operation 310, and then back to operation 308 until a transport mode selected by the user is available to the selected recipient.

Figure 4:
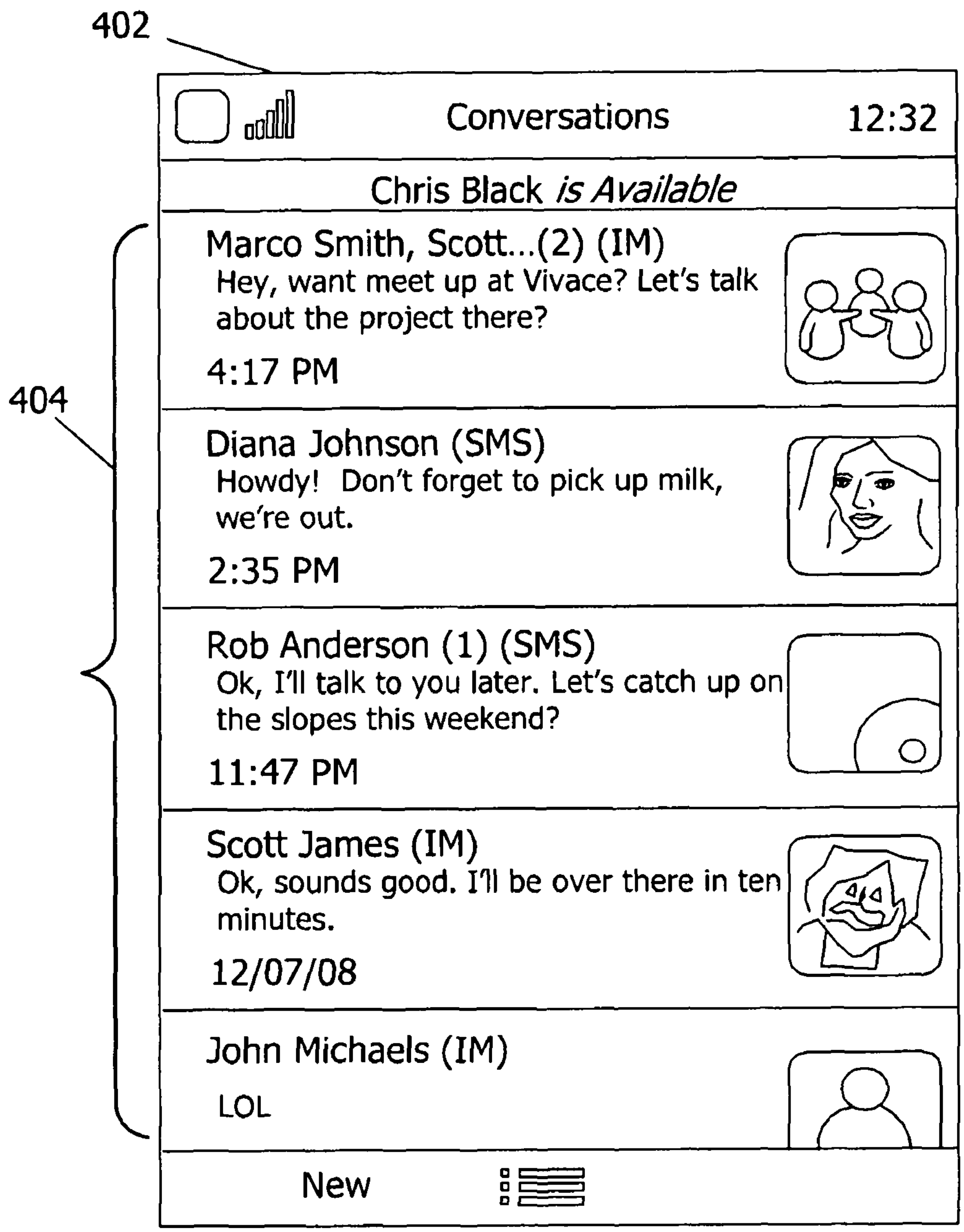
FIGS. 4, 5 and 6, are exemplary screen shots illustrating communication threads displaying messages from multiple transport modes.

Referring next to FIG. 4, an exemplary user interface 402 shows a list of existing communication threads that are available for selection. After a user indicates a desire to continue an existing communication thread (e.g., see operation 306 above), a list of recipients that are involved in existing communication threads are presented to the user at 404 along with available transport modes for each recipient. In one embodiment, the application program 114 may present the existing communication threads based on a default setting, for example, a list starting with the most recent to the least recent, or a list of communication threads starting with the most accessed to the least accessed, along with the available transport modes corresponding to each recipient. In a further embodiment, the application program 114 may present the user with options for presenting the existing communication threads prior to presenting the existing communication threads. The options may include an option to list the existing communication threads starting with the most recent to the least recent, an option to list the existing communication threads starting with the most accessed to the least accessed, an option to list the existing communication threads in alphabetical order based on the recipients, and an option to type/select a name of a recipient and thereafter present the existing communication thread that corresponds to the recipient.

In the example of FIG. 4, the communication channel mode for each communication thread is illustrated. For example, SMS is used to communicate with recipient Diana while IM is used to communicate with recipient Scott.

Figure 5:
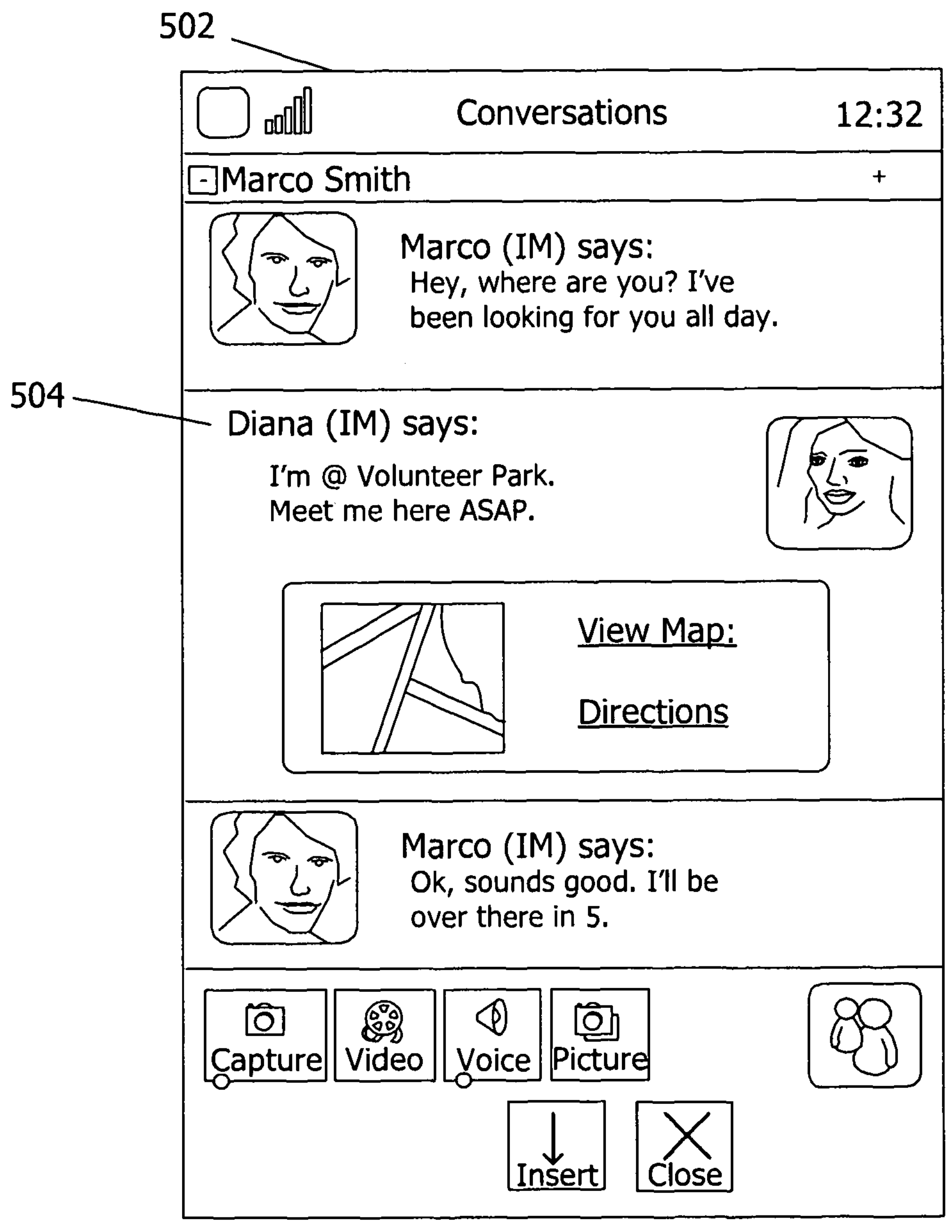

Referring next to FIG. 5, a user interface 502 illustrates a conversation in a communication thread. The illustrated communication thread may be an existing communication thread that a user has selected, or the communication thread may be a new communication thread. In one embodiment, a current transport mode used in the conversation may be the transport mode that was last used in the communication thread. In one embodiment, and as describe below with reference to FIG. 6, if there was a change in a presence status with the previous transport mode used, an indication would be shown within the communication thread that a status has changed. In contrast, an indication at 504 indicates that Marco and Diana are available via, for example IM, otherwise a separate indication would have been shown. Therefore, in this example, IM is the selected transport mode, for example, the last transport mode used in the selected communication string.

Figure 6:
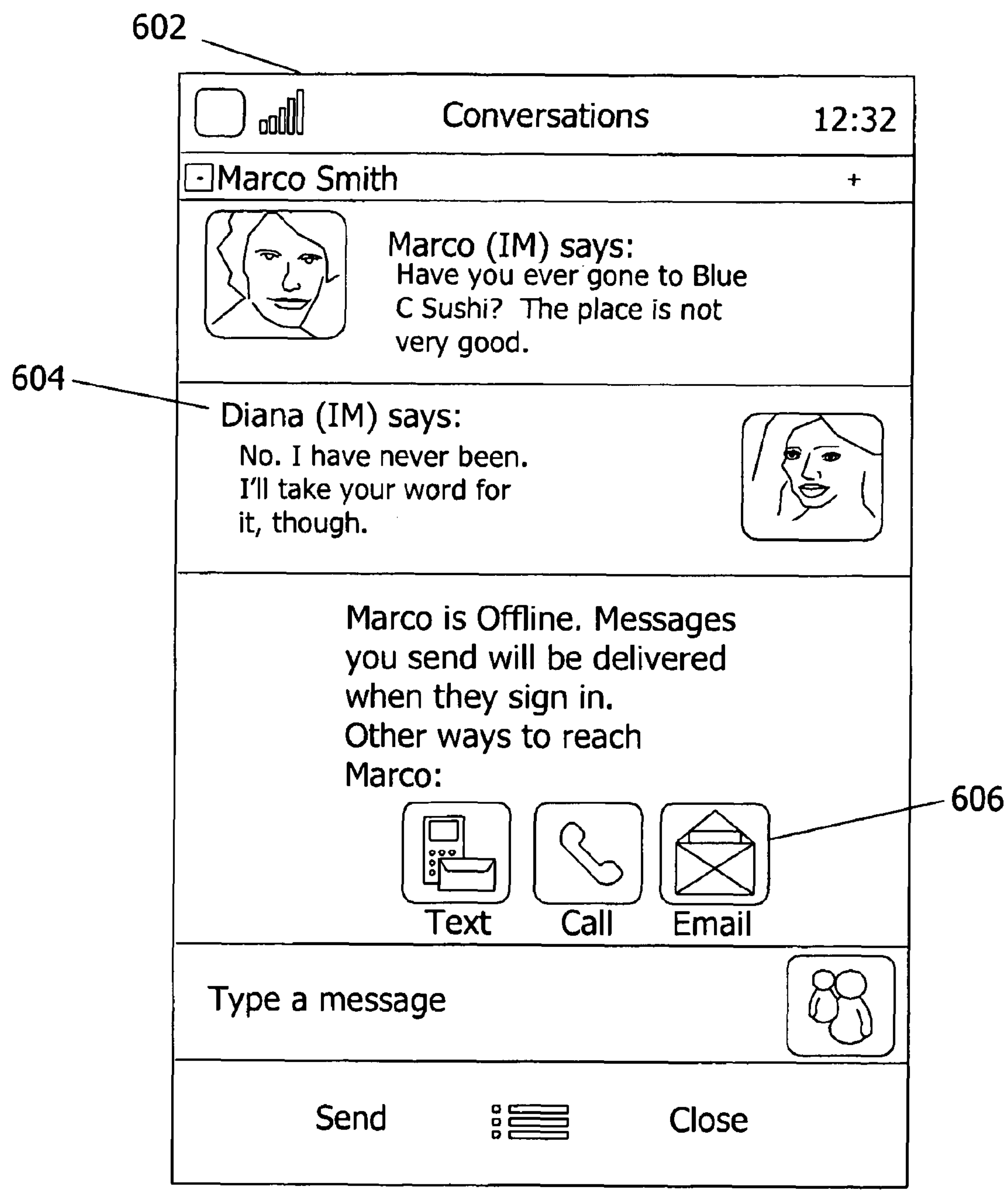

Referring next to FIG. 6, an exemplary user interface 602 of an application program is shown. The application program 114 presents a message to the user at 604 indicating that Marco is presently offline and IM is not an available transport mode for Marco. As shown in FIG. 6, the indication that a presence of a recipient is not available, for example with respect to IM, is threaded inline within the conversation. The user interface 602 may further provide the user with a message at 604 that indicates that the message will be sent via the selected transport mode when Marco signs in. In an alternate embodiment, at 606 a list of available transport modes may be provided to the user. Thus, the user may select a transport mode from the list of available transport modes at 606 if the user desires the message to be sent immediately. Once a user selects an alternate transport mode, the user interface 602 maintains a seamless integration of alternate transport mode without switching applications. Thus, the user is visually provided with a seamless integration of a conversation that includes multiple transport modes. In a further embodiment, if no transport modes are available based on a presence status of a selected recipient, the user may select a transport mode to send a message therefrom, and once the selected transport mode is available to the selected recipient, the transport component transmits the message to the selected recipient. In an alternate embodiment, the user may indicate that the message be sent via the first available transport mode. Thus, once a transport mode becomes available to the selected recipient, the message is sent to the selected recipient via the first available transport mode. In a further embodiment, a provider of each transport mode may also provide features to be presented to the user with respect to the selected transport mode. For example, an IM provider, SMS provider, or email provider may present advertisements as well as specific options within IM, SMS and/or email (depending on which one is selected as the transport mode) on the user interface 602 that a user would normally see if accessing the individual applications themselves.

Exemplary Operating Environment

A computer or computing device such as described herein has one or more processors or processing units, system memory, and some form of computer readable media. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

The computer may operate in a networked environment using logical connections to one or more remote computers, such as a remote computer. Although described in connection with an exemplary computing system environment, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein. Aspects of the invention may also be practiced in distributed computing environments where tasks are performed by remote processing devices that are linked through a communications network. In a distributed computing environment, program modules may be located in both local and remote computer storage media including memory storage devices.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for aggregating the first message and the second message into a single message thread managed by the application program executing on the mobile computing device, and exemplary means for providing the user with one or more alternate transport modes when a change in a presence status of the selected recipients is detected.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system for integrating multiple transport modes into a single communication stream on a mobile computing device, said system comprising:

a memory area for storing an application program for execution on a mobile computing device; and a processor programmed to:

present, to a user, one or more recipients and transport modes for communication therewith;

receive, from the user, a selection of one or more of the recipients;

receive, from the user, a selected transport mode for communication with the one or more selected recipients;

receive, from the user via the application program stored in the memory area, a first message to send to the one or more selected recipients;

transmit the received first message to the selected recipients via the selected transport mode, the transmitted first message being displayed to the user in the single communication stream;

receive a second message from at least one of the selected recipients via a second one of the transport modes;

display, to the user by the application program, the received second message in the single communication stream; and on detecting a change in presence status of at least one of the one or more selected recipients, display, inline within the single communication stream, a list of other transport modes for communicating with the recipients whose presence status has changed.

2. The system of claim 1, wherein the list of other transport modes, displayed inline within the single communication stream, is ranked from a most desired transport mode to a least desired transport mode according to each of the recipients whose presence status has changed, wherein the first message comprises one or more of the following: audio data, image data, video data, and textual data.

3. The system of claim 1, wherein presenting the one or more recipients and the transport modes for communication is initiated upon a user request to access an address book on the mobile computing device.

4. The system of claim 1, further comprising means for aggregating the first message and the second message into a single message thread managed by the application program executing on the mobile computing device.

5. The system of claim 1, further comprising means for providing the user with one or more alternate transport modes when the change in the presence status of the selected recipients is detected.

6. A method comprising:

identifying, in response to accessing an address book, one or more recipients and transport modes for communication therewith;

receiving, by an application program executing on a computing device, a selection of one or more of the recipients;

receiving, by the application program, a first message from a user to send to the selected one or more recipients;

transmitting, by the computing device over a first one of the one or more transport modes, the received first message to the selected one or more recipients, the transmitted first message being displayed to the user in a communication stream;

receiving, by the computing device over a second one of the one or more transport modes, a second message from at least one of the selected one or more recipients;

displaying, by the application program, the received second message to the user in the same communication stream; and on detecting a change in presence status of at least one of the selected one or more recipients, displaying, inline within the same communication stream, a list of transport modes other than the first one for communicating with the recipients whose presence status has changed.

7. The method of claim 6, further comprising selecting the first one of the transport modes, the identification of the one or more recipients and the transport modes for communication being initiated upon a user request to access an address book on the computing device.

8. The method of claim 6, further comprising:

selecting another transport mode from the displayed list of transport modes; and transmitting, using the application program, additional messages from the user to the selected one or more recipients via the selected other transport mode.

9. The method of claim 6, further comprising receiving an indication from the user to initiate a new communication thread.

10. The method of claim 9, further comprising presenting the user with a list of recipients available for the new communication thread.

11. The method of claim 6, further comprising receiving an indication from the user to continue an existing communication thread.

12. The method of claim 11, further comprising presenting the user with a list of existing communication threads.

13. The method of claim 12, wherein the existing communication threads are presented in order of most recent to least recent along with available transport modes corresponding to each recipient.

14. The method of claim 13, wherein the list of transport modes, displayed inline within the same communication stream, is ranked from a most desired transport mode to a least desired transport mode according to each of the recipients whose presence status has changed.

15. One or more computer storage media storing computer-executable components, said components comprising:

a first transport component that when executed by at least one processor causes the at least one processor to send a first message to a recipient using an application program and a first transport mode in a communication stream;

a second transport component that when executed by at least one processor causes the at least one processor to send a second message to the recipient using the application program and a second transport mode;

an interface component that when executed by at least one processor causes the at least one processor to receive a third message from the recipient using the first or second transport mode; and a display component that when executed by at least one processor causes the at least one processor to display, by the application program, the first message, the second message, and the received third message in the same communication stream in a user interface; and a detection component that when executed by at least one processor causes the at least one processor to provide the user with one or more alternate transport modes inline within the same communication stream when a change in a presence status of the recipient is detected.

16. The computer storage media of claim 15, wherein execution of the display component by the processor further causes the processor to display the first message, the second message, and the third message in a single message thread on the user interface, the user interface further displaying, inline within the same communication stream, a location map to reach the recipient.

17. The computer storage media of claim 15, wherein the first message comprises one or more of the following: audio data, image data, video data, and textual data.

18. The computer storage media of claim 15, wherein the alternate transport modes provided inline within the same communication stream are ranked from a most desired transport mode to a least desired transport mode according to the recipient whose presence status has changed.

19. The computer storage media of claim 15, further comprising a third transport component that when executed by at least one processor causes the at least one processor to transmit a fourth message from the user to the recipient via one of the alternate transport modes, the one of the alternate transport modes being selected from the one or more alternate transport modes provided inline within the same communication stream.

20. The computer storage media of claim 19, wherein execution of the display component by the processor further causes the processor to display the first message, the second message, the third message, and the fourth message in a single message thread on the user interface.

* * * * *